(12) United States Patent  
Pringnitz (10) Patent No.: US 9,532,510 B2
(45) Date of Patent: Jan. 3, 2017

(54) FOLDABLE-STORABLE POLE SAW (71) Applicant: Todd Pringnitz, Mount Pleasant, IA (US)

(72) Inventor: Todd Pringnitz, Mount Pleasant, IA (US)

(*) Notice: Subject to any disclaimer, the term of this patent is extended or adjusted under 35 U.S.C. 154(b) by 189 days.

(21) Appl. No.: 14/203,706

(22) Filed: Mar. 11, 2014

(65) Prior Publication Data
US 2014/0190016 A1 Jul. 10, 2014

Related U.S. Application Data (63) Continuation-in-part of application No. 13/633,204, filed on Oct. 2, 2012, now Pat. No. 9,101,095.

(51) Int. Cl.
*A01G 3/08* (2006.01)
*B23D 51/01* (2006.01)
*B27B 21/04* (2006.01)
*B23D 51/03* (2006.01)

(52) U.S. Cl.
CPC ............ *A01G 3/083* (2013.01); *B23D 51/01* (2013.01); *B23D 51/03* (2013.01); *B27B 21/04* (2013.01); *Y10T 29/49826* (2015.01)

(58) Field of Classification Search
CPC .......... A01G 3/06; A01G 3/062; A01G 3/065; A01G 3/067; A01G 3/08; A01G 3/081; A01G 3/083; A01G 3/085
USPC ................................................ 30/162, 296.1
See application file for complete search history.

(56) References Cited

U.S. PATENT DOCUMENTS

| | | | | |
|---|---|---|---|---|
| 3,360,858 A | * | 1/1968 | Cowley | A01G 3/0255 24/129 R |
| 3,613,283 A | * | 10/1971 | Mozey, Jr. | F41C 27/18 30/296.1 |
| D237,458 S | * | 11/1975 | Laughlin | D8/99 |
| 4,033,036 A | * | 7/1977 | Morris | A01G 3/0255 30/144 |
| 4,660,284 A | * | 4/1987 | Decarolis | B23D 49/14 30/157 |
| D300,112 S | | 3/1989 | Osterhout | |
| D304,154 S | | 10/1989 | Osterhout | |
| 4,947,551 A | * | 8/1990 | Deisch | B26B 1/046 30/161 |
| 5,063,628 A | * | 11/1991 | Campbell | B26B 11/00 294/51 |
| D346,937 S | | 5/1994 | Backman | |
| 5,553,386 A | | 9/1996 | Hsu | |
| 5,634,276 A | | 6/1997 | Lin | |

(Continued)

*Primary Examiner* — Jason Daniel Prone
*Assistant Examiner* — Richard Crosby, Jr.
(74) *Attorney, Agent, or Firm* — Price Heneveld LLP (57) ABSTRACT A pole saw includes a long handle with end adapter, a blade-carrying component pivoted to the end adapter for movement between an extended use position and a handle-adjacent storage position, and a saw blade fixed to the blade-carrying component. The end adapter and holding component are cast aluminum for strength and light weight, and are pivoted together about an offset axis so that the blade and blade-carrying component are positioned adjacent the handle in a partially protected position when collapsed for storage. A folding lock mechanism includes an anchor that engages a saw-holding bolt on the blade-carrying component, and a wing nut that can be tightened to secure the sheath on the blade.

9 Claims, 10 Drawing Sheets

(56) References Cited

U.S. PATENT DOCUMENTS

| | | | |
|---|---|---|---|
| 5,787,536 A * | 8/1998 | Pate | B27B 17/0008 30/122 |
| 5,787,590 A * | 8/1998 | D'Alessandro, Sr. | A01G 3/053 16/429 |
| 5,860,216 A * | 1/1999 | Shellnutt | B23D 51/10 30/166.3 |
| D406,039 S | 2/1999 | Okada | |
| D433,914 S | 11/2000 | Chu | |
| 6,560,805 B2 * | 5/2003 | Dallas | B23D 57/0076 7/116 |
| D482,257 S | 11/2003 | Taylor et al. | |
| 6,694,621 B1 * | 2/2004 | Boley | A01G 3/08 30/211 |
| 6,742,264 B1 * | 6/2004 | Urion | B23D 51/10 30/166.3 |
| 7,017,234 B2 | 3/2006 | Anderson | |
| 7,065,885 B1 | 6/2006 | Chen | |
| D530,180 S | 10/2006 | Klecker et al. | |
| 7,337,933 B1 * | 3/2008 | Klinberg | A47G 25/82 223/118 |
| D582,243 S | 12/2008 | Freeman et al. | |
| D582,747 S | 12/2008 | Freeman et al. | |
| D588,433 S | 3/2009 | van Deursen | |
| D637,882 S | 5/2011 | Bloch | |
| 7,937,839 B2 * | 5/2011 | Fidgen | A01G 3/0255 30/135 |
| 7,958,640 B1 * | 6/2011 | Mandriota | A01G 3/08 30/144 |
| D664,823 S | 8/2012 | Pringnitz | |
| 8,905,696 B2 * | 12/2014 | Lapointe | B25G 3/00 16/426 |
| 2003/0177648 A1 * | 9/2003 | Zeiter | B26B 21/523 30/526 |
| 2004/0107585 A1 * | 6/2004 | Helmrich | B26B 19/38 30/537 |
| 2005/0247523 A1 * | 11/2005 | Sewell | B25G 1/04 182/187 |
| 2009/0064511 A1 * | 3/2009 | Crawford | B23D 51/01 30/517 |
| 2014/0144028 A1 * | 5/2014 | Gilbert | B26B 1/10 30/321 |
| 2016/0016238 A1 * | 1/2016 | Beck | B27B 21/06 30/512 |

* cited by examiner

FOLDABLE-STORABLE POLE SAW

The present application is a continuation in part of application Ser. No. 13/633,204, filed Oct. 2, 2012, entitled FOLDABLE-STORABLE POLE SAW, the entire contents of which are incorporated herein by reference.

BACKGROUND

The present invention relates to pole saws, and more particularly relates to a foldable-collapsible pole saw that is storable in a compact position, yet when expanded is durable and robust.

Pole saws are commonly used to cut tree branches located well above a person's reach. However, known pole saws cannot be folded or collapsed to a blade-protected compact storage position, thus making them difficult for hunters, arborists, and/or gardeners to carry. Pole saws often can be broken down for compact storage. But disassembly risks losing parts, and also takes manual labor, tools and time. Further, disassembly becomes more difficult as components become corroded, worn, and/or damaged. Still further, many pole saws are not easily stored even when broken down.

SUMMARY OF THE PRESENT INVENTION

In one aspect of the present invention, a pole saw apparatus comprises a long pole with end adapter defining a pivot axis that is offset from a centerline of the pole, and a blade assembly pivoted to the end adapter for movement about the offset pivot axis between an extended use position and a handle-adjacent storage position.

In another aspect of the present invention, a folding saw apparatus comprises a long handle with end adapter, the handle defining a longitudinal centerline and the end adapter including first apertured flanges defining an offset pivot axis extending perpendicular to but not intersecting the centerline, and a blade assembly including a blade and a blade-carrying component including mating flanges pivoted to the aperture flanges for movement between an extended use position and a storage position where the blade is adjacent the handle. The apparatus also includes a locking mechanism configured to lock the blade and blade-carrying component in the extended use position.

In another aspect of the present invention, a method of using and storing a pole saw apparatus comprises providing a long pole defining a centerline and having an end adapter defining an offset pivot axis not intersecting the centerline, and attaching a blade assembly having a blade and a blade-carrying component to the end adapter for movement about the offset axis between an extended use position where the blade extends longitudinally from the pole and a storage position where the blade is adjacent the long pole. The method further includes moving the saw blade and blade-carrying component around the offset pivot axis to the extended use position and then using the saw blade to saw, and also moving the saw blade and blade-carrying component around the offset pivot axis to the storage position to store the saw blade in a position partially protected by the pole.

An object of the present invention is to provide a foldable pole saw that is durable, robust, and yet simply constructed, so that it can be used by hunters and other out-of-door users in a rugged environment, yet that is collapsible for compact safe storage.

An object of the present invention is to provide a foldable pole saw with blade that can be folded into a partially-protected position adjacent the pole when not in use.

An object of the present invention is to provide a cast blade-holding component having multiple features cast therein, the cast component being lightweight, durable, blade-protecting, and adapted for attachment to a pole.

These and other aspects, objects, and features of the present invention will be understood and appreciated by those skilled in the art upon studying the following specification, claims, and appended drawings.

DETAILED DESCRIPTION OF PREFERRED EMBODIMENTS

The present pole saw apparatus 20 (FIGS. 1-4) includes a telescopingly-collapsible long handle 21 (also called a "pole" or "elongated extendable handle" herein) with end adapter 22, a saw-blade holding component 23 (cast of aluminum, also called a "saw-blade-storing component" herein) pivoted on an offset axis to the end adapter 22 for movement between an extended use position and a handle-adjacent storage position, and a blade 24 (also called a "saw blade" herein) pivoted to the holding component 23 for movement between a blade-use position and a blade-protected blade-stored position where the blade 24 is partially in a recess in the component 23. The end adapter 22 and holding component 23 are cast of aluminum for strength, light weight, for multi-function, and to reduce secondary manufacturing operations.

Figure 5:
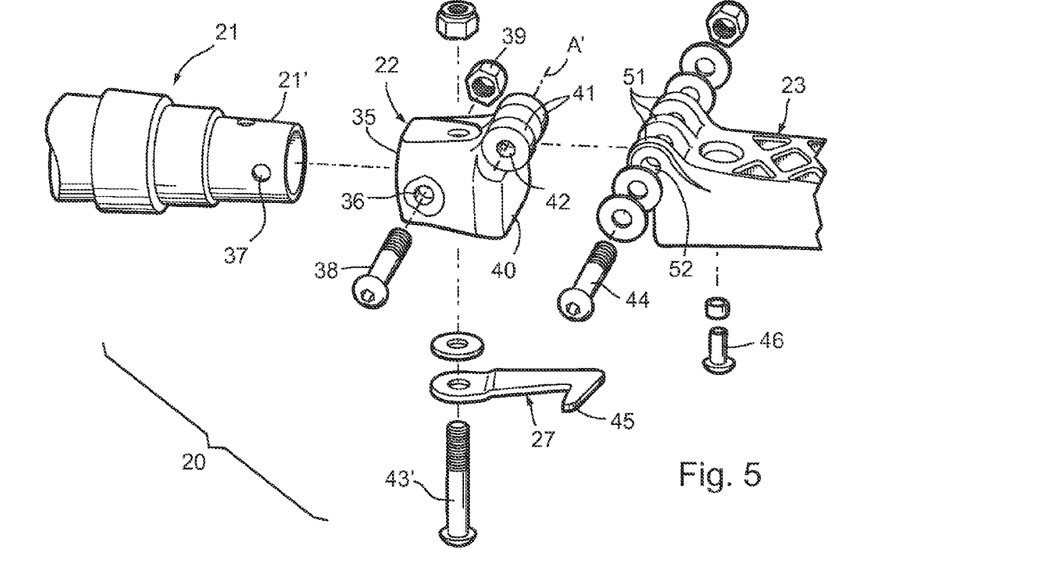
FIGS. 5-6 are exploded views of FIG. 1 showing various components.
Figure 9:
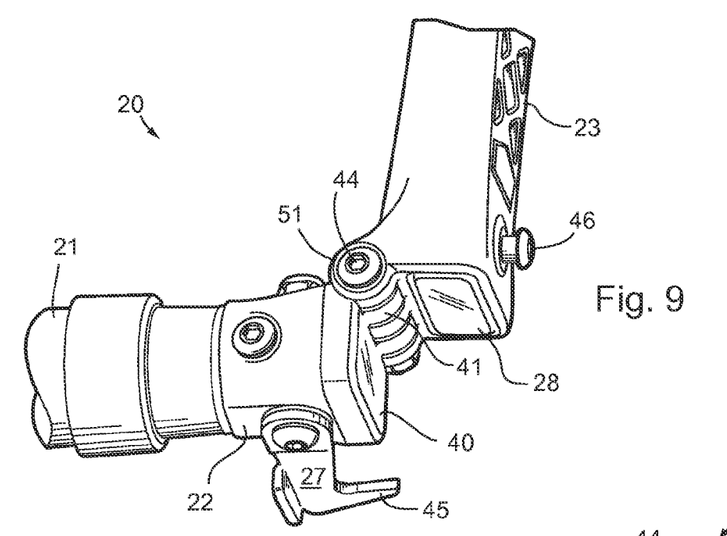
FIGS. 9-10 are partial perspective views showing the folding pole saw in partial open and fully open positions.
Figures 10, 11:
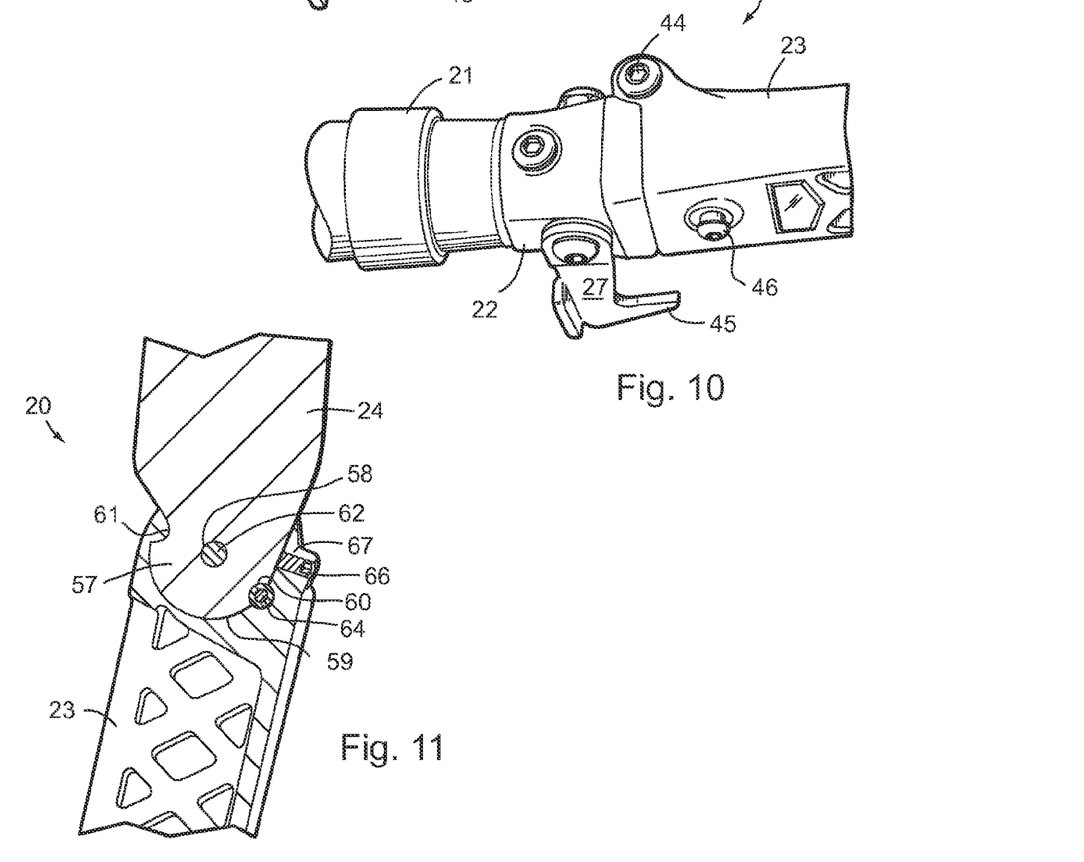
FIG. 11 is a side view of FIG. 7 with portions broken away to show underlying components.
Figure 12:
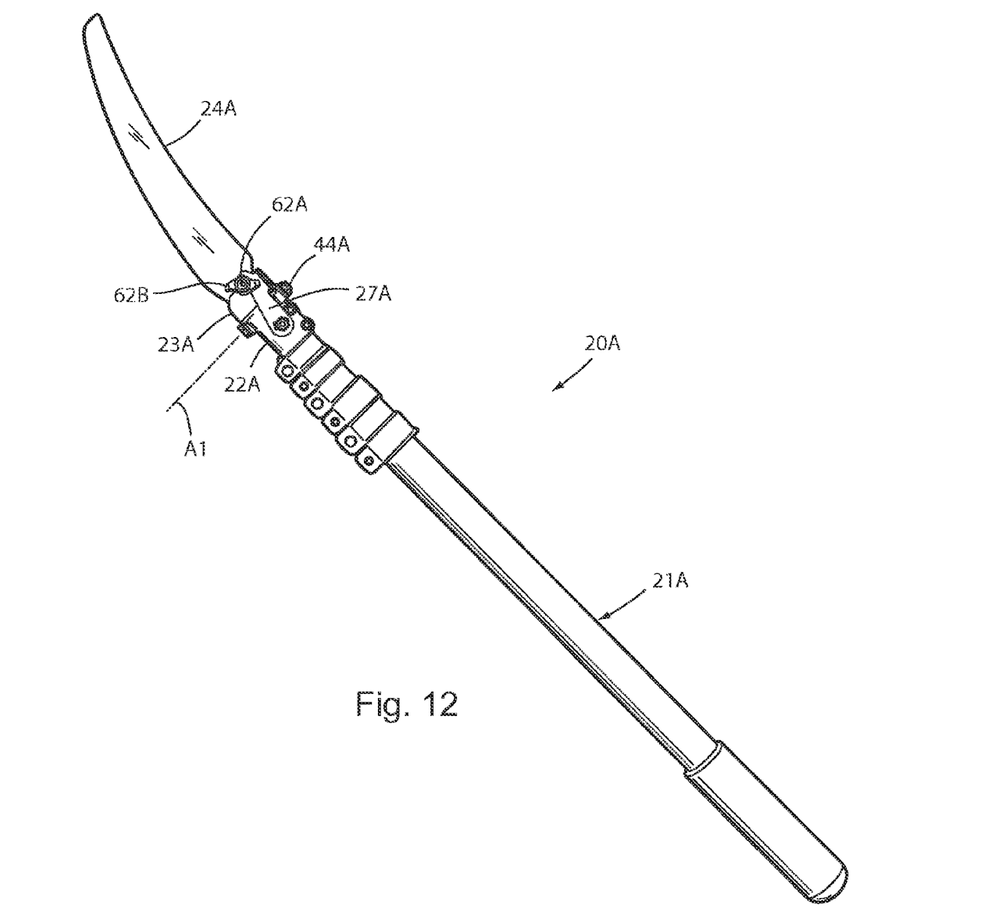
FIG. 12 is a side view of a modified folding pole saw similar to FIG. 1, but that includes a fore-shortened saw-blade-holding component that does not include a saw-blade-storing feature.

The adapter 22 and component 23 (FIGS. 4-5) include overlapping aperture flanges defining an offset axis A1 so that the blade 24 and blade-holding component 23 can be folded to a storage position adjacent the handle 21. The storage position places the blade 24 and component 23 in a partially protected position beside the handle, which is also a very compact position for easy storage and handling. Notably, no disassembly or separate tool is required to move the blade 24 between the blade-use position and blade-protected position, nor to move the component 23 between the handle-adjacent storage position and the extended use position. A folding lock mechanism 26 (FIG. 3) includes a hook 27 and biasing pressure pad 28 (FIG. 9) that cooperate with the hinge (flanges 41, 51, pin 44) for secure locking the blade 23 in the extended use position (FIGS. 3-4 and note FIG. 10), as explained below. An adjustable set screw 66 on the saw-holding component 23 eliminates blade looseness when the blade 23 is in the extended use position, such that it provides an improved stability and sense of high quality, which is often important to users.

The pole 21 (FIGS. 1-4) includes telescopingly-collapsible tube sections 31-31D and fixing clamps 32-32C that can be rotated to secure the tube sections 31-31D in collapsed or extended positions. Such poles are known in the art, such that a detailed description is not required for a person skilled in this art to understand the present disclosure.

Figure 5A:
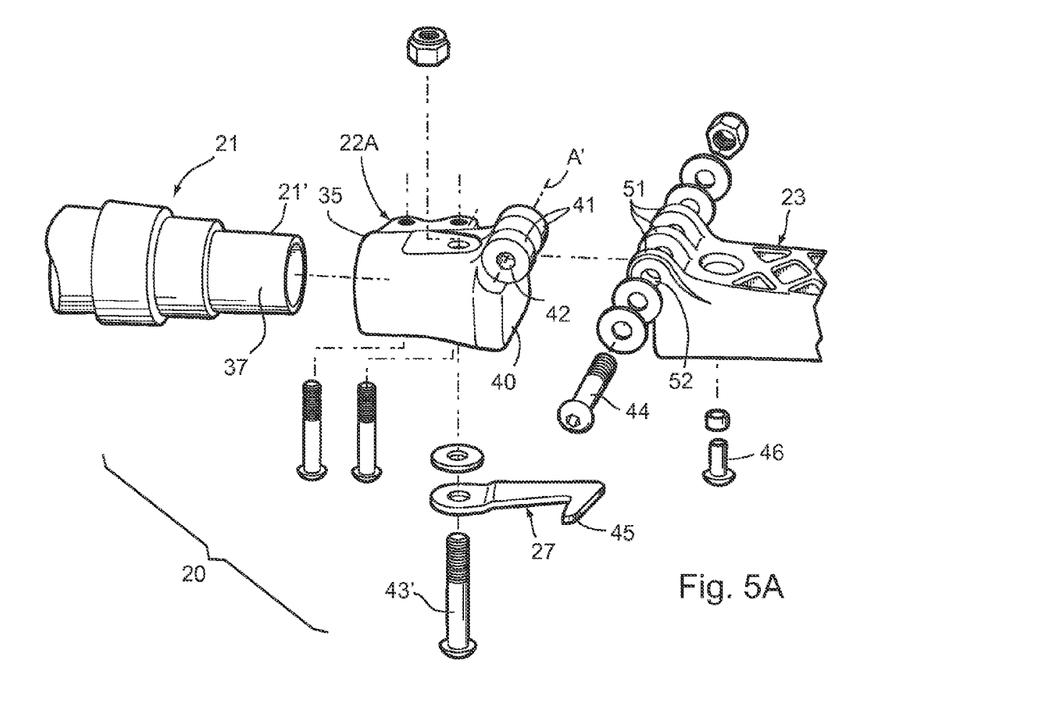
FIG. 5A shows a similar design but using an alternative clamp.
Figure 6:
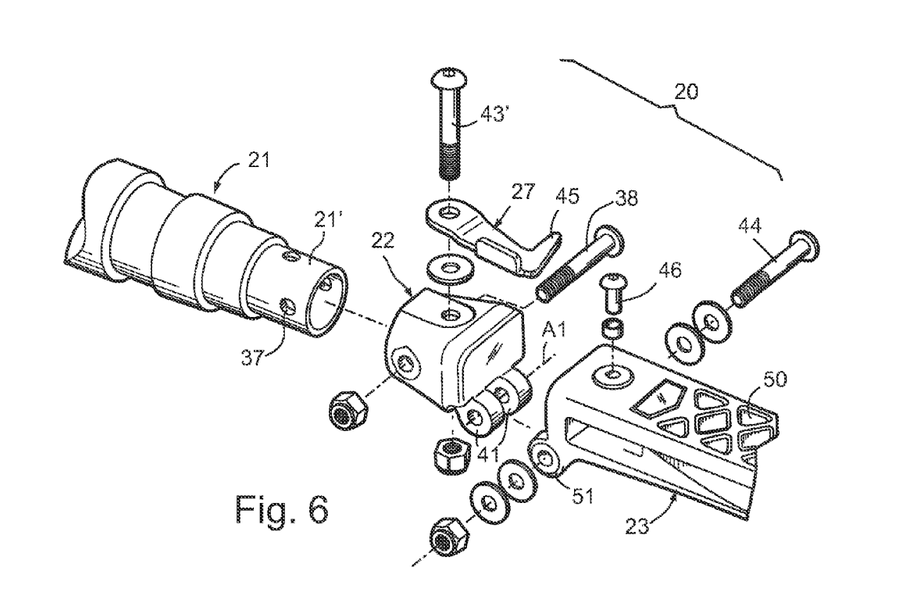
Figure 7:
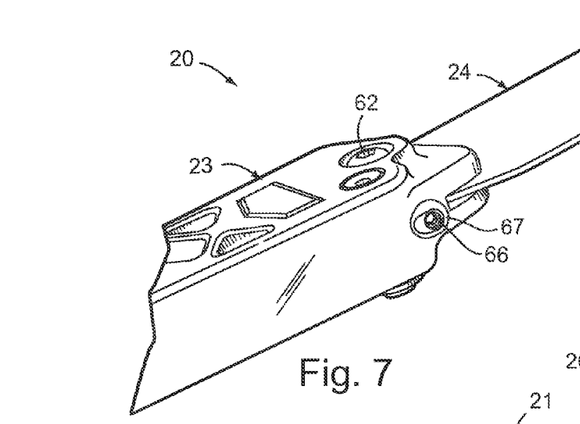
FIG. 7 is a side view of FIG. 1 and showing a blade-tightening set screw.
Figure 8:
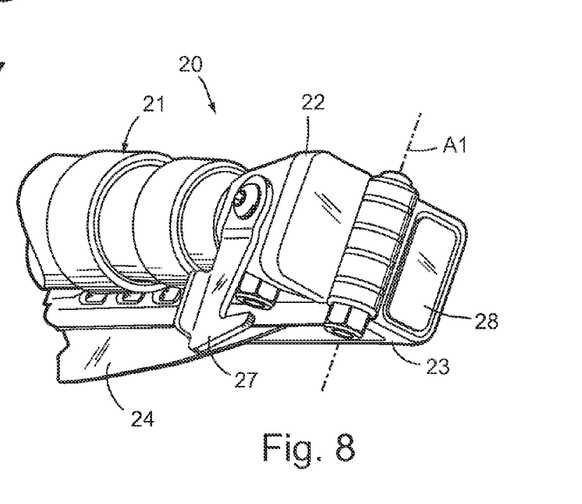
FIG. 8 is an enlarged view of the retainer for holding open the saw blade, the retainer including a hook and pin, and also a resilient compression pad and abutting surface for bias.

End adapter 22 (FIG. 5) is cast of aluminum, and includes a butt end 35 that receives an end 21' of the pole 21, Holes 36 in the adapter 22 and holes 37 in the pole 21 align for receiving an attachment bolt 38 and nut 39. An opposite end of the illustrated adapter 22 includes a flat surface 40 and offset flanges 41 with apertures 42 that form an offset hinge axis A1 extending parallel the holes 36 and 37. A hook-mounting hole 43 extends through the adapter 22 in a direction perpendicular to the hinge axis A1, and is located about midway on the adapter 22. The hole 43 receives a pin 43' for pivotally mounting the hook 27 to the adapter 22. The hook 27 includes hooked end 45 that is movable from a stored location beside the pole 21 to a locking position where it engages a stud 46 on the component 23. FIG. 5A shows an alternative design where an insert tube clamp adapter 22A is used in place of the bolt through clamp adapter 22. See FIG. 13A below.

Figure 1:
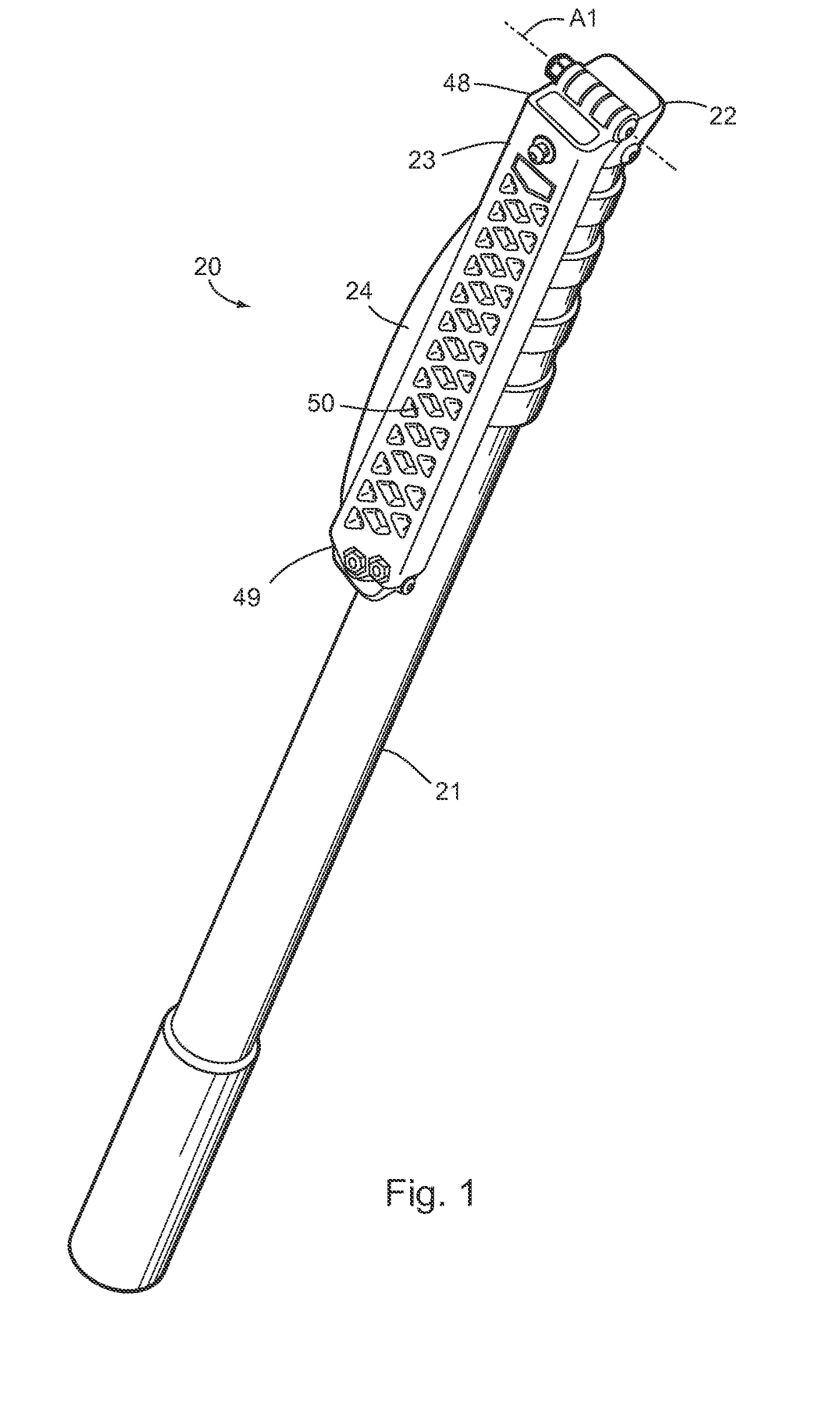
FIGS. 1-2 are front and rear views of a folding pole saw embodying the present invention.
Figure 2:
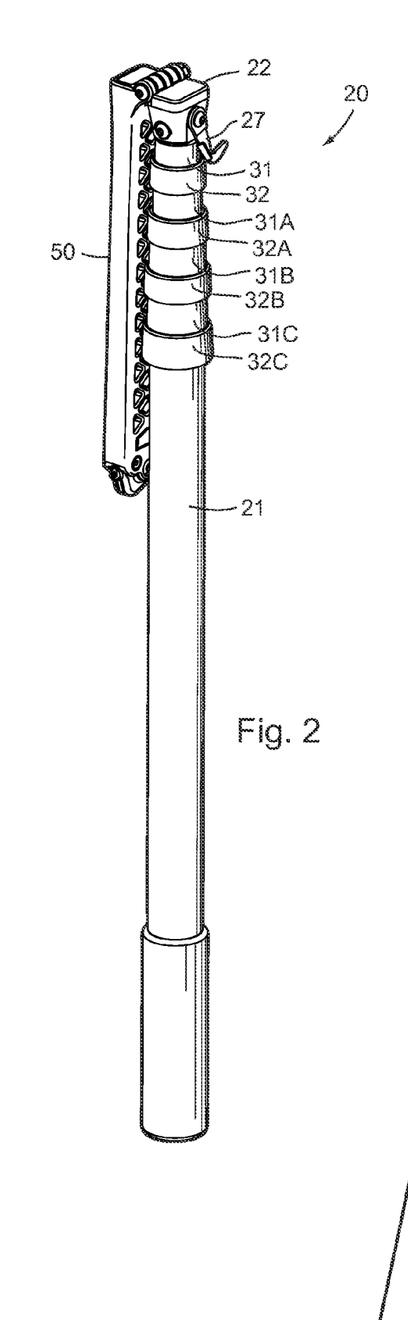
Figure 3:
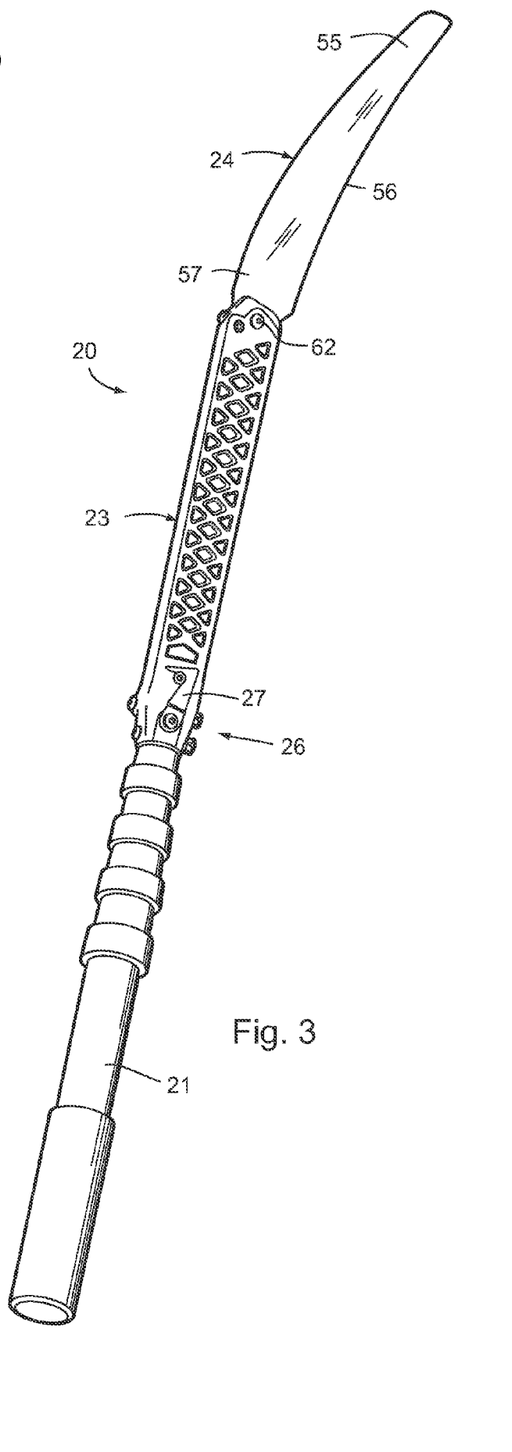
FIGS. 3-4 are front and rear views of the saw from FIG. 1 but expanded for use.
Figure 4:
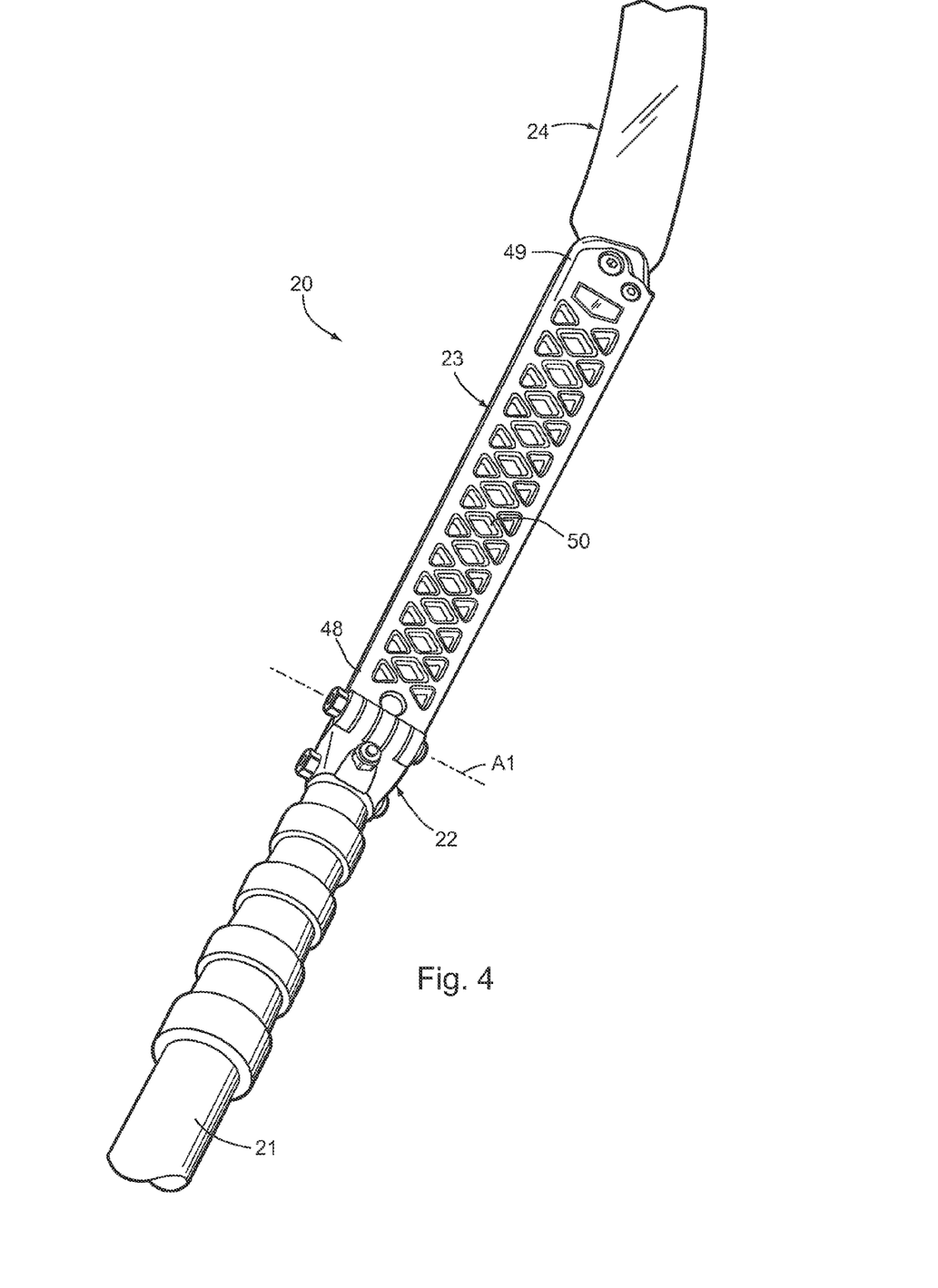

Saw-holding component 23 (FIG. 1) is cast of aluminum, and includes a pole-attached end 48 and a blade-attached end 49, with a recess-forming body 50 extending therebetween. The body 50 includes opposing side panels and connecting strip that form a recess shaped to receive most (if not all of) the blade 24, including its cutting edge (i.e. along the blade's cutting teeth). Also, the side panels of the component 23 include criss-crossing ribs and apertures that both maintain its strength and also lighten its total weight (and also reduce total material). The pole-attached end 48 (FIG. 5) includes a plurality of flanges 51 (three flanges being illustrated) that interfit with the flanges 41, and that include apertures 52 that align with apertures 42 in flanges 41 and that receive the hinge pin 44. The offset position of the hinge pin 44 and axis A1 causes the component 23 and blade 24 to move between an extended use position where the component 23 and blade 24 are generally aligned with the pole 21 (FIGS. 3-4), and to move to the handle-adjacent storage position where the component 23 and blade 24 are adjacent an end of the pole 21 (FIGS. 1-2). Notably, the axis A1 extends a same direction as the sawing plane P1 defined by the blade 24, such that the flanges 41 and 51 and hinge pin 44 provide good strength extending in a direction parallel the sawing plane P1 (defined by the large flat surfaces of the blade 24 as it cuts through a tree branch). The hook 27 and stud 46 also provide good strength extending in a direction parallel the sawing plane P1, The combination of the components 41/44/51 and components 27/46 form a strong torsional support structure within the sawing plane P1, which improves a stability and durability and strength of the present apparatus 20 when used for sawing. Notably, the illustrated axis A1 is located outside of, but near a side surface of the component 23, so that when folded to the storage position, the component 23 is very close to the pole 21, thus providing an optimal and compact arrangement.

The saw blade 24 (FIGS. 3 and 11) includes a blade end 55 including a cutting edge 56 with teeth, and with a mount end 57 including a pivot hole 58 (FIG. 11) and an arcuate edge 59 extending partially around the pivot hole 58. The arcuate edge 59 including two indentations 60 and 61, the first detent 60 holding the blade 24 in its extended use position, and the second detent 61 holding the blade 24 in its storage position. A pivot pin 62 engages the pivot hole 58 and pivotally mounts the blade 24 to the blade-holding component 23 for movement between the extended use position (shown in FIGS. 3 and 11) and a handle-adjacent storage position (shown in FIGS. 1-2). A detent pin 64 selectively frictionally engages the indentations 60, 61 to hold the blade 24 in a selected one of the positions relative to the component 23.

It is contemplated that the detent pin 64 can be resilient so that the blade 24 can be moved with enough force to overcome the friction retaining the blade 24 in a selected detent position. Alternatively, it is contemplated that the detent pin 64 can be made to be telescopingly movable within its mounting hole in the component 23 and spring biased, such that the detent pin 64 must be moved/shifted in order to disengage it from the detent indentation 60 (or from indentation 61). For example, a notch (not specifically shown) can be cut into detent pin 64 so that upon being shifted, the notch aligns with the blade 24 to allow the blade 24 to be rotated to anew angular position on the component 23. This later alternative retains the blade 24 in its selected position much more positively than the first alternative.

A set screw 66 (FIG. 11) is threaded into e component 23 at a location where the end of its shaft abuts the edge of the blade 24 at location 67. The set screw 66 is adjustable and can be used to eliminate looseness of the blade 24 relative to the blade-holding component 23 when the blade 23 is in the expanded use position. This provides increased stability and improved feel to a user, thus providing a better quality feel.

Notably, the folding lock mechanism 26 with hook 27 and pressure pad 28 provide several advantages. The pressure pad 28 is resilient and slightly compressed when the hook 27 is engaged with the retainer stud 46. Thus, the pressure pad 28 provides a spring biasing force against the hook 27 that helps retain the hook 27 in engagement with the stud 46. Also, an inner surface of the hook end of the hook 27 is made to engage the stud 46 with increasing force as the hook 27 is moved into engagement, such that the hook 27, once engaged, tends to stay frictionally engaged. Also, the pad 28 provides a buffer damping shocks against the blade 23, which further enhances use and function of the present apparatus 20, including its durability and long term use.

Modification

A modified pole saw apparatus 20A (FIGS. 12-19) includes several components similar to pole apparatus 20 (FIGS. 1-11), and those components are identified using identical numbers but with a letter "A" added to the number. This is done to reduce redundant discussion. A biggest modification is that the blade-carrying component 23A (FIG.

Figure 13:
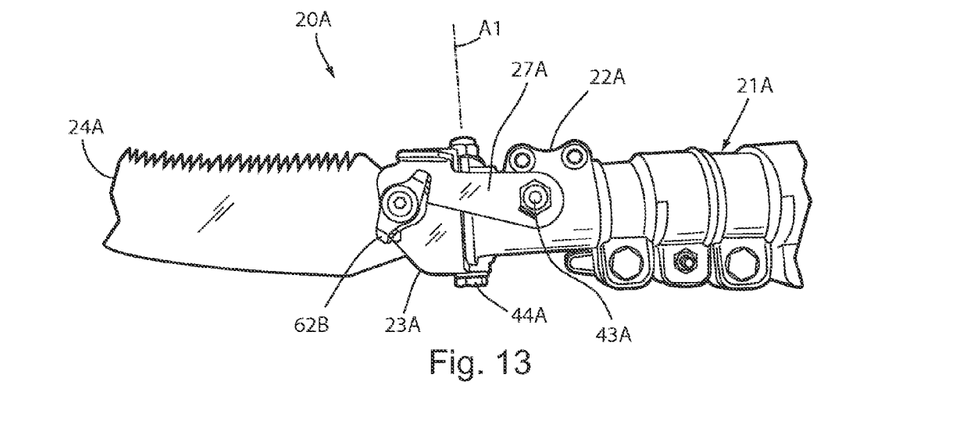
FIG. 13 is an enlarged view of a fore-shortened saw-holding component of FIG. 12.
Figure 13A:
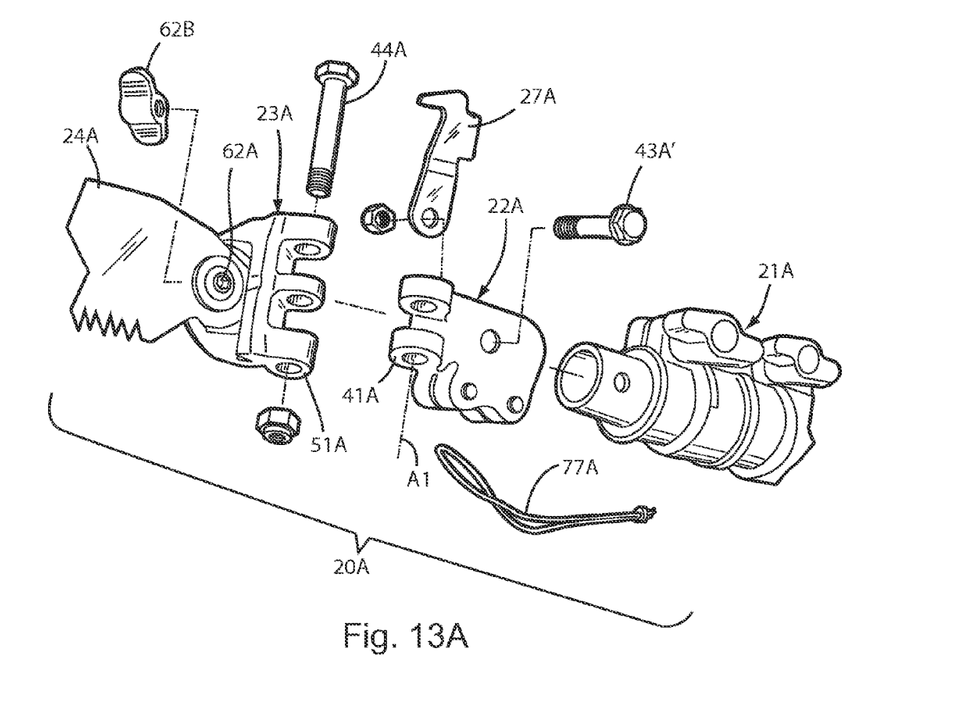
FIG. 13A is an exploded view of FIG. 13.
Figure 14:
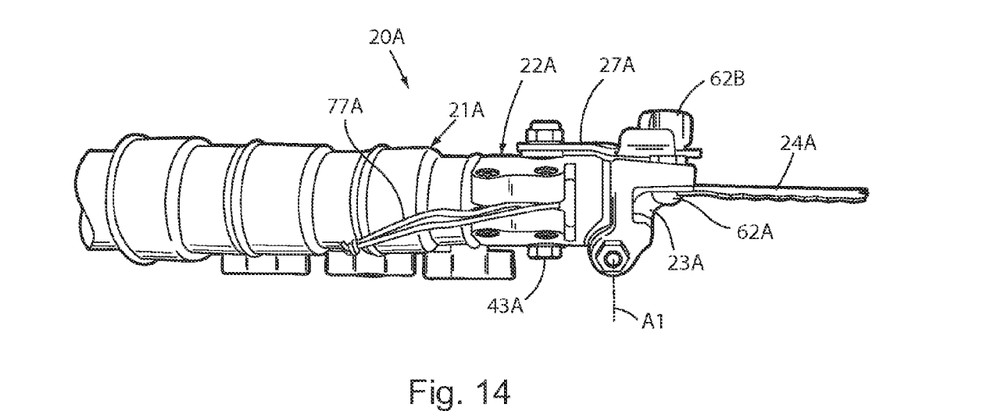
FIGS. 14-15 are bottom and side views of FIG. 13.
Figure 15:
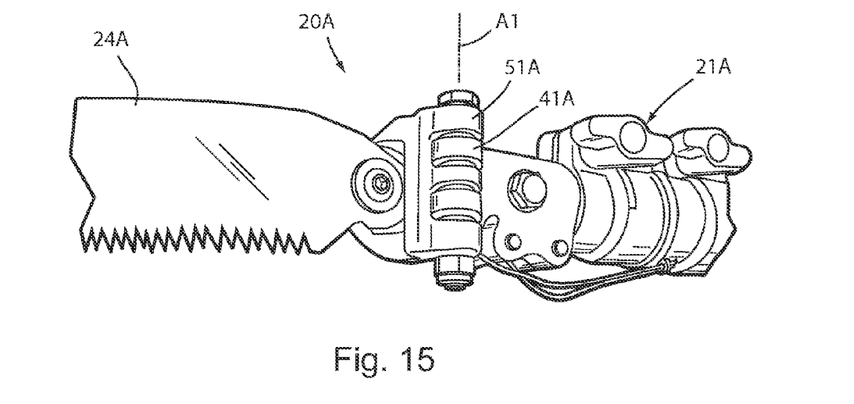
Figure 16:
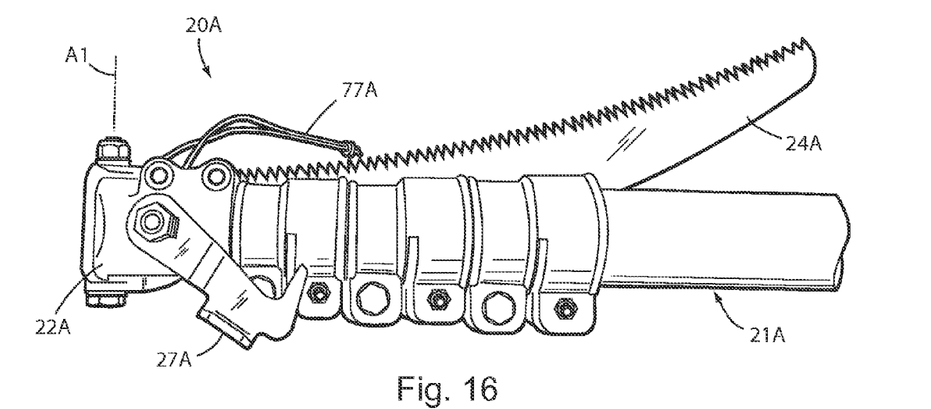
FIGS. 16-18 are enlarged side, opposite side, and top views of FIG. 13 but with the blade in a collapsed storage position adjacent the pole.
Figure 17:
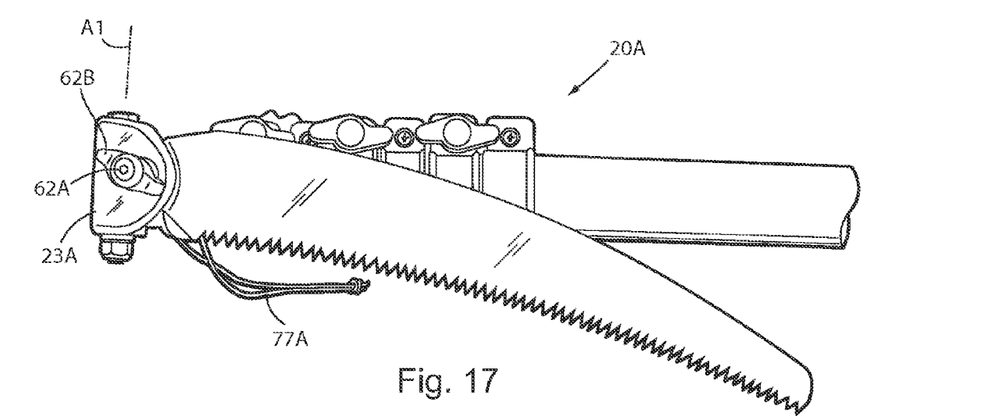
Figure 18:
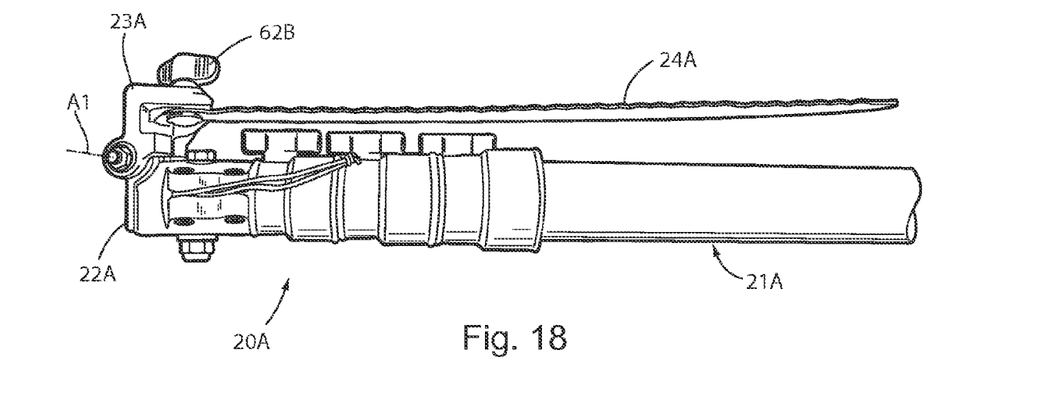

13A) (also called "blade-holding component" herein) does not define a recess for receiving the blade 24A. Instead, the blade 24A when stored is only partially protected by being adjacent the pole 21A. The blade 24A can also be protected by a blade-covering sheath 75A (FIG. 19) that completely and securely covers the blade 24A, as described below.

More specifically, the modified pole apparatus 20A (FIG. 13A) includes a telescopingly-collapsible long handle 21A (also called a "pole" or "elongated extendable handle" herein) with end adapter 22A, a blade-carrying component 23A pivoted on an offset axis to the end adapter 22A for movement between an extended use position (FIGS. 14-15) and a handle-adjacent storage position (FIGS. 16-17), and a blade 24A (FIG. 13A) (also called a "saw blade" herein) fixedly attached to the blade-carrying component 23A. Notably, the blade-carrying holding component. 23A does not include a recess, but instead when collapsed, positions the blade adjacent the pole 21A for "partial" protection. The sheath 75A (FIG. 19) can be used to more completely protect the blade 24A, as described below. The end adapter 22A and blade-carrying component 23A are cast of aluminum for strength, light weight, for multi-function, and to reduce secondary manufacturing operations. The bolt 62A attaching the blade 24A to the blade-carrying component 23A includes a wing nut 62B that can be tightened using one's hands to facilitate manually attaching the blade 24A to the blade-carrying component 23A without using tools. Notably, the wing nut 62B and bolt 62A provide an attachment site for an anchor 76A on the sheath 75A for holding the sheath 75A on the blade 24A, as described below.

The adapter 22A and blade-carrying component 23A (FIG. 3) include overlapping aperture flanges defining an offset axis A1 so that the blade 24A and blade-carrying component 23A can be folded to a storage position adjacent the handle 21A. The storage position places the blade 24A and component 23A in a partially protected position beside the handle, which is also a very compact position for easy storage and handling. Notably, no disassembly or separate tool is required to move the blade 24A and the component 23A between the handle-adjacent storage position and the blade-extended use position. A folding lock mechanism 26A includes a hook 27A and biasing pressure pad 28A that cooperate with the hinge (flanges 41A, 51A, pin 44A) for secure locking the blade 23A in the extended use position. An adjustable set screw 66A on the blade-carrying component 23A eliminates blade looseness when the blade 23A is in the extended use position, such that it provides an improved stability and sense of high quality, which is often important to users. FIG. 13A is an exploded perspective view of FIG. 13 showing various components. The wing nut 62B can be used to frictionally retain the hook 27A on the bolt 62A if desired. Alternatively, the hook 27A can be given some frictional resistance to rotation.

Figure 19:
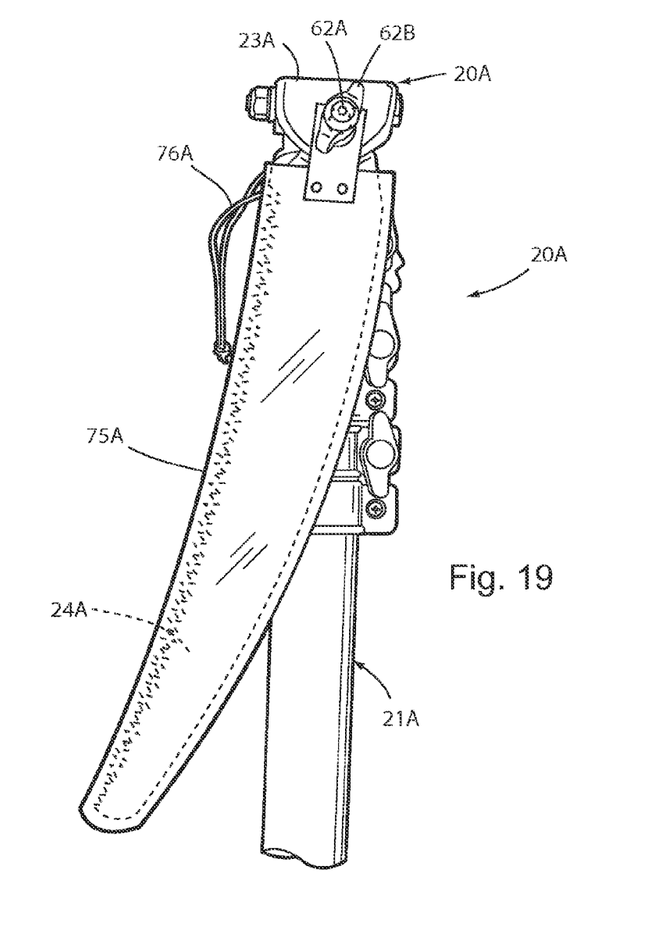
FIG. 19 is a side view similar to FIG. 17, but including a sheath covering the blade, the sheath being anchored to the saw-holding component.

FIG. 19 is a side view of a sheath 75A that fits over and protects the blade 24A. It can be used when the blade 24A is in an unfolded use position or when in its collapsed storage position, The sheath 75A includes an anchor 76A (also called a retainer herein) that can be used to positively secure the sheath on the blade 24A. The illustrated anchor 76 A is a two-arm clip (metal or plastic) with opposing legs configured to resiliently engage the shaft of bolt 62A. The anchor 76A is secured by frictionally engaging the blade-attaching bolt 62A. The wing nut 62B can be loosened to facilitate the connection, and then tightened to provide a desired level of secured attachment. The sheath 75A is made of a durable flexible material such as a suitable plastic, leather, or other durable sheet material. The sheath 75A includes side walls defining a cavity therebetween with width and length (slightly curved along its length) shaped to generally match a shape of the blade 24A. This allows the blade 24A to be slid into the sheath 75A much like a sword being slid into a scabbard. In use, the sheath 75A can be slid onto the blade 24A (or the blade 24A slid into the sheath 75A), and the blade 24A pivoted to its compact storage position adjacent the pole, relatively quickly and easily. The sheath 75A is then secured using the anchor 76A. A carry strap 77A can be attached to the saw apparatus 20A if desired, such as by securing the strap 77A to a bolt (such as bolt 62A) or around the pole 21A.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A pole saw apparatus comprising:
   a pole with end adapter including a pivot bolt defining an offset pivot axis that is offset from and perpendicular to a centerline of the pole;
   a blade-carrying component pivoted to the adapter by the pivot bolt and movable around the offset pivot axis between an extended use position and a handle-adjacent storage position;
   a blade attached to the blade-carrying component by a second bolt; and
   a lock mechanism releasably securing the blade-carrying component in the extended use position.

2. The apparatus defined in claim 1, wherein the lock mechanism includes a hook that releasably engages the second bolt.

3. The apparatus defined in claim 2, including a wing nut engaging the second bolt that can be tightened without separate tools to more securely hold the blade.

4. The apparatus defined in claim 3, including a sheath configured to slip onto the blade to protect the blade when not in use and when in the handle-adjacent storage position.

5. The apparatus defined in claim 1, wherein the second bolt extends generally perpendicular to the pivot bolt.

6. A pole saw apparatus comprising:
   a pole with end adapter including a pivot bolt defining an offset pivot axis that is offset from a centerline of the pole;
   a blade-carrying component pivoted to the adapter by the pivot bolt and movable around the offset pivot axis between an extended use position and a handle-adjacent storage position;
   a blade attached to the blade-carrying component by a second bolt; and
   a hook on the end adapter movable to releasably engage the second bolt to secure the blade-carrying component in the extended use position.

7. A pole saw apparatus comprising:
   a pole with end adapter defining an offset pivot axis that is offset from to a centerline of the pole;
   a blade-carrying component pivoted to the adapter and movable around the offset pivot axis between an extended use position and a handle-adjacent storage position;
   a blade attached to the blade-carrying component; and
   a sheath configured to slip onto and matably cover the blade when the blade and blade-carrying component are in the handle-adjacent storage position.

8. A pole saw apparatus comprising:
a pole with end adapter defining an offset pivot axis that is offset from and perpendicular to a centerline of the pole;
a blade-carrying component pivoted to the adapter and movable around the offset pivot axis between an extended use position and a handle-adjacent storage position;
a blade attached to the blade-carrying component by a second bolt; the blade including a surface extending partially around the second bolt; and
at least one detent indentation on the blade and a detent pin on the end adapter for engaging the at least detent indentation; and
an adjuster for adjusting a tightness of the blade to eliminate blade looseness.

9. The pole saw apparatus of claim 8, wherein the adjuster includes a set screw.

\* \* \* \* \*